(12) United States Patent
Pashkevich et al.

(10) Patent No.: US 8,948,565 B2
(45) Date of Patent: Feb. 3, 2015

(54) METHOD AND SYSTEM FOR UTILIZING STORAGE IN NETWORK VIDEO RECORDERS

(71) Applicant: Nice-Systems Ltd, Ra'anana (IL)

(72) Inventors: Sergey Pashkevich, Netanya (IL);
Doron Girmonsky, Raanana (IL);
Yaron Shmueli, Kfar-Saba (IL); Meir Bechor, Kiryat Ono (IL)

(73) Assignee: Nice-Systems Ltd, Ra'anana (IL)

( * ) Notice: Subject to any disclaimer, the term of this patent is extended or adjusted under 35 U.S.C. 154(b) by 0 days.

(21) Appl. No.: 14/010,556

(22) Filed: Aug. 27, 2013

(65) Prior Publication Data

US 2013/0343731 A1     Dec. 26, 2013

Related U.S. Application Data

(63) Continuation of application No. 13/353,333, filed on Jan. 19, 2012, now Pat. No. 8,548,297, which is a continuation-in-part of application No. 12/208,357, filed on Sep. 11, 2008, now Pat. No. 8,234,682.

(51) Int. Cl.

| H04N 5/765 | (2006.01) |
|---|---|
| H04N 9/80 | (2006.01) |
| H04N 5/92 | (2006.01) |
| H04N 5/917 | (2006.01) |
| H04N 5/91 | (2006.01) |
| H04N 7/18 | (2006.01) |
| H04N 9/804 | (2006.01) |
| H04N 21/231 | (2011.01) |
| H04N 21/2747 | (2011.01) |
| H04N 9/79 | (2006.01) |
| H04N 9/82 | (2006.01) |

(52) U.S. Cl.
CPC ............... *H04N 5/917* (2013.01); *H04N 5/765* (2013.01); *H04N 5/91* (2013.01); *H04N 7/181* (2013.01); *H04N 9/7921* (2013.01); *H04N 9/8042* (2013.01); *H04N 9/8205* (2013.01); *H04N 21/23113* (2013.01); *H04N 21/2747* (2013.01)
USPC ........... 386/200; 386/232; 386/239; 386/248; 386/326; 386/328

(58) Field of Classification Search
USPC .................. 386/200–234, 291–299, 326–342
See application file for complete search history.

(56) References Cited

U.S. PATENT DOCUMENTS

| 6,704,280 B1 * | 3/2004 | Mangin et al. ................. 370/230 |
| 2008/0112489 A1 * | 5/2008 | Malladi et al. ............ 375/240.22 |
| 2010/0131671 A1 * | 5/2010 | Kohli et al. .................... 709/233 |
| 2013/0212440 A1 * | 8/2013 | Rom et al. .................... 714/47.1 |
| 2014/0032781 A1 * | 1/2014 | Casey et al. ................... 709/233 |

* cited by examiner

*Primary Examiner* — Hung Dang
(74) *Attorney, Agent, or Firm* — Soroker Agmon

(57) ABSTRACT

The subject matter discloses a method, comprising obtaining a current retention time of storage associated with a digital recorder; obtaining current bitrates of channels used to transmit video captured by edge devices communicating with the digital recorder. The method then determines change in compression rates to be allocated to at least a portion of the channels according to the current retention time and the current bitrates and transmits the change in compression rates to be allocated to the channels to edge devices communicating with the digital recorder. The method can be implemented in a system in which several digital recorders use the same storage.

8 Claims, 11 Drawing Sheets

| SEVERITY RANGE | ACTION NUMBER | ACTION | DISTRIBUTION OF BITRATE-REDUCING FACTOR ||||||
|---|---|---|---|---|---|---|---|---|
| | | | CH1 ECL | CH2 ECL | CH3 ECL | CH1 BRAP | CH2 BRAP | CH3 BRAP |
| < 0 | | NO ACTION | 0 | 0 | 0 | 100 | 100 | 100 |
| < 0.083 | 1 | Ch 2, ECL = 50 | 0 | 50 | 0 | 100 | 100 | 100 |
| < 0.167 | 2 | Ch 1, ECL= 50 | 50 | 50 | 0 | 100 | 100 | 100 |
| < 0.250 | 3 | Ch 3, ECL= 50 | 50 | 50 | 50 | 100 | 100 | 100 |
| < 0.333 | 4 | Ch 2, ECL = 100 | 50 | 50 | 50 | 100 | 100 | 100 |
| < 0.417 | 5 | Ch 1, ECL = 100 | 100 | 100 | 50 | 100 | 100 | 100 |
| < 0.500 | 6 | Ch 3, ECL = 100 | 100 | 100 | 100 | 100 | 100 | 100 |
| < 0.583 | 7 | Ch 2, BRAP = 90 | 100 | 100 | 100 | 100 | 90 | 100 |
| < 0.667 | 8 | Ch 1, BRAP = 90 | 100 | 100 | 100 | 90 | 90 | 100 |
| < 0.750 | 9 | Ch 2, BRAP = 80 | 100 | 100 | 100 | 90 | 80 | 100 |
| < 0.833 | 10 | Ch 1, BRAP = 80 | 100 | 100 | 100 | 80 | 80 | 100 |
| < 0.917 | 11 | Ch 3, BRAP = 90 | 100 | 100 | 100 | 80 | 80 | 90 |
| ≥ 0.917 | 12 | Ch 3, BRAP = 80 | 100 | 100 | 100 | 80 | 80 | 80 |

| SEVERITY RANGE | ACTION NUMBER | ACTION | CH1 ECL | CH2 ECL | CH3 ECL | CH1 BRAP | CH2 BRAP | CH3 BRAP |
|---|---|---|---|---|---|---|---|---|
| < 0 | | NO ACTION | 0 | 0 | 0 | 100 | 100 | 100 |
| < 0.083 | 1 | Ch 2, ECL = 50 | 0 | 50 | 0 | 100 | 100 | 100 |
| < 0.167 | 2 | Ch 1, ECL = 50 | 50 | 50 | 0 | 100 | 100 | 100 |
| < 0.250 | 3 | Ch 3, ECL = 50 | 50 | 50 | 50 | 100 | 100 | 100 |
| < 0.333 | 4 | Ch 2, ECL = 100 | 50 | 100 | 50 | 100 | 100 | 100 |
| < 0.417 | 5 | Ch 1, ECL = 100 | 100 | 100 | 50 | 100 | 100 | 100 |
| < 0.500 | 6 | Ch 3, ECL = 100 | 100 | 100 | 100 | 100 | 100 | 100 |
| < 0.583 | 7 | Ch 2, BRAP = 90 | 100 | 100 | 100 | 100 | 90 | 100 |
| < 0.667 | 8 | Ch 1, BRAP = 90 | 100 | 100 | 100 | 90 | 90 | 100 |
| < 0.750 | 9 | Ch 2, BRAP = 80 | 100 | 100 | 100 | 90 | 80 | 100 |
| < 0.833 | 10 | Ch 1, BRAP = 80 | 100 | 100 | 100 | 80 | 80 | 100 |
| < 0.917 | 11 | Ch 3, BRAP = 90 | 100 | 100 | 100 | 80 | 80 | 90 |
| ≥ 0.917 | 12 | Ch 3, BRAP = 80 | 100 | 100 | 100 | 80 | 80 | 80 |

FIG. 8B

METHOD AND SYSTEM FOR UTILIZING STORAGE IN NETWORK VIDEO RECORDERS

FIELD OF THE INVENTION

The subject matter relates generally to network video recorders, and more specifically to storage utilization in network video recorders.

BACKGROUND OF THE INVENTION

Network video recorders (NVR) server function to record and store a digital video, usually from multiple video sources ("channels") simultaneously (tens or hundreds of channels). The video is stored on a dedicated storage of a certain constant capacity. Each channel has its average bitrate, which can be almost constant, or may be quite variable, depending on the device, the video scene, the compression parameters, etc.

The NVR stores the video streams on designated storage devices. The storage devices have a storage capacity that is shared between all the recording channels of the NVR. When the storage device is full, the oldest video segments are deleted automatically, in order to make room for the new recording. Every channel has a limited "retention time"—the period of time for which the video is available before deletion. The longer the desired retention time, the bigger storage capacity needed.

When the bitrate of all the recorded channels is constant and equal to a configured one, the storage size needed to maintain a desired retention time may be given by a retention value multiplied by the sum of bitrates of all channels. However, there are situations when the bitrate is lower than configured. The reasons for this are as follows:
1) Some edge devices work in "VBR" compression mode (variable bitrate). The VBR mode means that although the channels are configured to compress the video at a certain bitrate, they often achieve a higher compression (less bitrate), especially on some "simple" scenes, in "low motion" periods, etc.
2) The NVR may apply "enhanced compression" algorithms, which may achieve a further economy in bitrate. It is assumed that enhanced compression algorithms operate as a "black box", which receives as input a compressed video stream, and provide as output a "more compressed video stream", which, when decoded and displayed, yields video of the original quality.

The problem is that in those "reduced bitrate" cases (VBR or enhanced compression algorithms), the bitrate is lower in a non-deterministic way, so, one wouldn't know how much storage is needed exactly, in order to achieve significant reduction in storage size, but still comply with the desired retention time.

SUMMARY

It is an object of the subject matter to disclose a method, comprising obtaining a current retention time of a storage associated with a digital recorder and obtaining current bitrates of channels used to transmit video captured by edge devices communicating with the digital recorder. The method further comprises determining change in compression rates to be allocated to at least a portion of the channels according to the current retention time and the current bitrates and transmitting the change in compression rates to be allocated to the channels to edge devices communicating with the digital recorder.

In some cases, the method further comprises a step of determining change in bitrates to be allocated to at least a portion of the channels according to the current retention time and the current bitrates; and transmitting the bitrates to be allocated to the channels to edge devices communicating with the digital recorder.

In some cases, the method is performed in edge devices communicating with more than one digital recorder sharing the storage.

In some cases, the method further comprises a step of determining a severity value according to the current retention time, a guaranteed retention time and a target retention time.

In some cases, the method further comprises a step of determining a severity hysteresis value. In some cases, the severity hysteresis value is used to determine bitrates to be allocated to at least a portion of the channels.

In some cases, detecting that the current retention time is bigger than a target retention time; and further comprises a step of increasing the bitrates of at least some of the channels.

It is another object of the subject matter to disclose a computerized system, comprising a first digital recorder configured to receive video from a plurality of edge devices, a storage configured to store the video received from a plurality of edge devices and a Global Rate Control (GRC) module for controlling the performance of the video provided by the plurality of edge devices.

In some cases, the system further comprises a second digital recorder, wherein the storage further stores video from edge devices communicating with the second digital recorder.

In some cases, the GRC module is configured to obtain current retention time of a storage associated with the first digital recorder. In some cases, the GRC module is configured to obtain current compression rates of channels used to transmit video captured by edge devices communicating with the first digital recorder. In some cases, the GRC module is configured to determine compression rates to be allocated to at least a portion of the channels according to the current retention time and the current bitrates. In some cases, the GRC module is configured to transmit the compression rates to be allocated to the channels to edge devices communicating with the digital recorder.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

FIG. 8B shows an actions table, according to exemplary embodiments of the disclosed subject matter;

DETAILED DESCRIPTION

Embodiments of the present invention may provide system and method for central management of distributed video data recording systems in a surveillance-recording environment. It presents optimizations methods and system architectures of recording systems that may be used for playback and analysis, for example, in video surveillance, control and supervision applications.

Some embodiments may include dynamically receiving over a network bit rate parameters related to video processing units of one or more edge devices. The processing units may process video data received in real-time and may output video data for storage and real-time monitoring applications. Embodiments of the invention may further include dynamically adjusting a bit rate of one of the processing units based on required bit rates of the processing units and bandwidth limitations of the network.

Some embodiments may further include dynamically receiving storage parameters related to internal storage units of the edge devices and to external storage units coupled to the edge devices via the network, instructing one of the edge devices where to store the video data based on the storage parameters and bandwidth limitations of the network and delivering the video data from the internal storage units or from the external storage units to an end-user, based on information received from a site manager Embodiments of the invention may be performed by a site manager which may control the recording environment by management of resources, allocation of system resources and different environment architecture, for example, determining, for each edge-device, whether to store data, such as video data, in a local storage or in a remote storage, controlling parameters of sensors in the recording environment, controlling the bandwidth usage of entities in the recording environment and the like.

Figure 1:
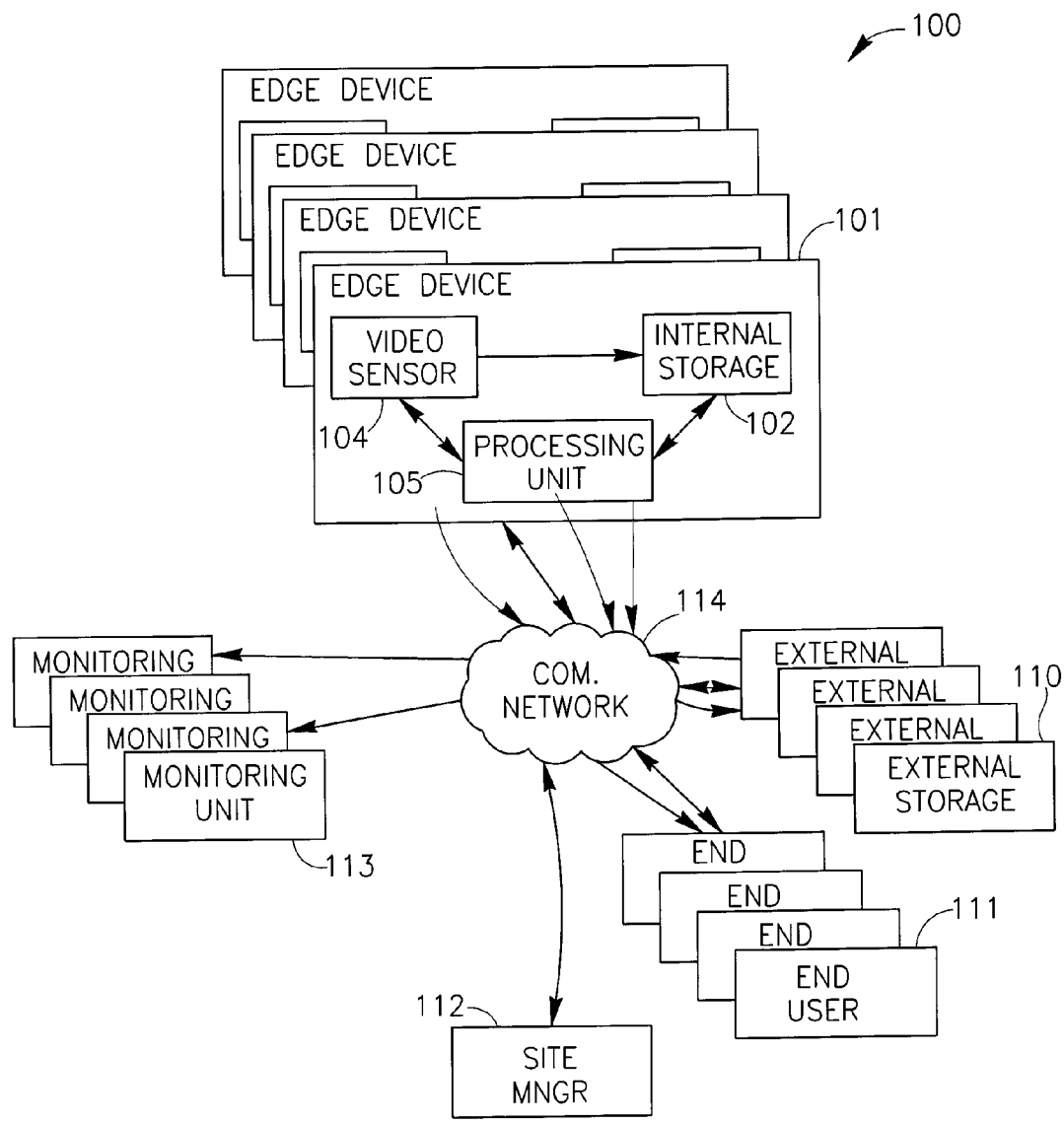
FIG. 1 is a high-level block diagram of an exemplary recording environment according to embodiments of the present invention.

Reference is now made to FIG. 1, which is high-level block diagram of an exemplary recording environment according to embodiments of the present invention. Recording environment 100, also referred herein to as "system", may be, for example, a video surveillance environment and may include one or more edge-devices 101, such as video cameras or encoders. Edge-device 101 may include a video sensor 104 to capture video data, a processing unit 105 process video data received in real-time and to output video data for storage in an internal storage 102 such as a hard disk drive or for real-time monitoring applications. Edge-device 101 may include any other modules, units or elements to allow sensing, capturing and processing of data, such as video data.

Although some demonstrative embodiments of the invention may describe operations which may be performed by the edge-device 101 or by elements included in the edge-device, such as sensor 104 or processing module 105, it should be understood to a person skilled in art that the invention is not limited in this respect and according to embodiments of the present invention any suitable element or module of edge-device 101 may perform such operations. For example, some embodiments may use sensor 104 to perform a certain action, however, other implementation of the same embodiments may use processing unit 105 or edge-device 101 to perform the same action.

Recording environment 100 may further include one or more external storages 110, a site manager 112 one or more monitoring units 113 and one or more end-users 111 all coupled to one or more edge-devices 101 via a wired or wireless communications network 114, for example, via an Internet Protocol (IP) network.

Management of all resources of environment 100 may be performed by site manager 112. Site manager 112 may control, manage and synchronize entities and resources in environment 100 in order to overcome limitations such as bandwidth, bit rate and real time limitations of entities, such as sensors 104, monitoring units 113 and end-users 111.

Site manager 112 may be a processing system or a computer and may include a local memory, processor, input and output devices, mass storage device, operating system and supporting software. Site manger may include any code, software, hardware or embedded code that when executed may result in controlling and managing system 100 by allocating system resources as described in detail with reference to embodiments of the invention Site manager 112 114 have information regarding the topology and structure of recording environment 100 or any other information regarding recording environment 100 to allow management of recording, playback, monitoring and data analysis in recording environment 100.

Site manager 112 may receive over communication network and may store information or parameters regarding the requirements and limitations of entities in environment 100. For example, site manager 112 may dynamically receive bit rate parameters such as the required bit rate of each processing unit 104 and/or sensor 104, bandwidth limitation of network 114, the required or supported bandwidth of internal storage 102 and external storage 110, the required bandwidth for monitoring unit 113, performance limitation of different entities in environment 100 and the required bandwidth for playback by each of end-users 111.

Site manager 112 may receive additional information regarding limitations, requirements and priorities from entities in environment 100. Site manager 112 may include a pre-defined list of requirements, may receive a list of the requirements and limitation from the entities in environment 100 or from a system administrator. Site manager 112 may dynamically receive an update of requirements, limitations and changes of requirements and limitations from entities. The requirements and limitation of entities in environment 100 may be delivered to site manger 112 by any way or method.

Site manager 112 may control the recording process and may optimize the performance of environment 100 by, for example, controlling sensors 104 and processing units 105, adjusting them, determining where to save recorded data and by centrally managing all entities of environment 100 based on a plurality of requirements and limitations of entities in environment 100. For example, site manager 112 may dynamically adjust a bit rate of one or more of processing units 105 based on required bit rates processing units 105 and bandwidth limitations of a rate of transferring bits of data of network 114.

Each sensor or a plurality of sensors 104 may further include one or more A/D (analog to digital) converters to receive the video data. Each sensor 104 and processing unit 105 may have its own requirements of bit process, transfer bit rate and performance under pre-defined configuration. A bit rate control may change, for example, parameters of the compression of a captured data according to motion, noise, texture or any other parameter in the captured data that may influence the bit rate. The rate control of each sensor, processing unit or multiple sensors 104 or processing units 105 may use its own control loop to change the compression algorithm and parameters in order to keep the required bit rate, for example, bit rate may be 256 Kilobytes per second, 8 megabytes per second or any other number of data bytes per second. Embodiments of the present invention may enable optimization of the performance of a system by presenting a centralized or global bit rate control for sensors 104, processing units 105 by site manager 112.

Site manager 112 may have a list of all sensors 104 and processing units 105 in environment 100. Each sensor 104 and/or processing unit 105 may have a required bit rate and a priority and\or any other parameters that may be used by site manager 112 to define a specific bit rate for a specific sensor 104 and specific processing unit 105 at a specific time. The priority of sensor 104 may be static and therefore pre-defined or dynamic according to motion, area of interest, limitation or any other.

Site manager 112 may calculate and statically or dynamically adjust and optimize the bit rates of edge-device 101, e.g., the bit rate of sensors 104 or/and processing units 105 and the bandwidth used by entities in environment 100 so it may be optimized according to the priorities and the other limitations. Site manager may change the bit rates of each of sensors 104 globally according to dynamic changes in environment 100. For example, if a certain edge-device 101 has higher priority, then it may get higher bit rate than the other edge-devices, or when dynamically one of the edge-devices may need higher bit rate site manager 112 may lower the bit rate from another edge-device so the total bandwidth of the networking, streaming and storage of environment 100 may remain according to its limitations.

According to other embodiments, environment 100 may have storage limitations or specific requirements and each edge-device 101 may have its own required bit rate. If a first edge-device 101 does not have to use the full bit rate since, for example, there is no motion at a captured video data, site manager 112 may allow other edge-devices to use the extra available bit rate that the first edge-device 101 does not use and may enable higher bit rate to other edge-devices. Site manager 112 may also check if extra or free bandwidth may be used for storage, streaming or encoding of data. If, for example, the system has limited bandwidth and dynamically one of edge-device 101 may not have to capture motion in the recorded video data, the bit rate of the a specific edge-device may be reduced. Site manager 112 may decide to increase the bit rate of one or more of the other edge-devices 101 according to priorities, limitations and parameters. According to other embodiments, site manager 112 may decide to stop one or more edge-device in order to reduce the size of data stream due to insufficient bandwidth for transmission of all captured data from all the edge-devices 101 over network 114.

Some embodiments of the invention may provide a global system for optimization based on time-related parameters. Site manager 112 may take into consideration varying requirements during different time or hours in a day, a part of a day, a week or any period of time. Site manager 112 may allow entities of system 100 to use high bit rates during specific period of times based on the knowledge or information that during other times a lower bit rate is required.

For example, in a surveillance environments motion at a recorded scene may vary during different days or during different times of a day, e.g., during night time the activity is lower than during the day time and thus the level of motion may be expected to be lower during night time hence a lower bit rate may be used by edge-device 101 to keep a certain quality level. Site manger 112 may decide to lower the bit rate during low activity times and may use the un-used bit rate during high activity times.

The configuration of entities in environment 100 may be done by site manger 112 statically when a user or a system administrator knows in advance when a higher or lower bit rates may be required. In other situation the configuration may also be done dynamically, for example, site manger 112 may collect and use statistics from edge-devices 101, e.g., of sensors 104 or processing units 105 during different times and calculate that in a certain time the bandwidth requirements are higher or lower than other time, and may divide the bandwidth resources between edge-devices 101 accordingly. For example, if a required bit rate is decreased at one time, site manger 112 may provide more bandwidth or storage space to other edge-devices at different time in order to keep the average bandwidth and/or storage requirements.

Environment 100 may dynamically be adjusted by site manager 112, for example, by adjusting a plurality of parameters such as, available bandwidth, overall quality of the link between devices in environment 100. Such adjustments or changes may result in a plurality of events such as delay, jitter and packet loss. A video surveillance system, such as environment 100, may be susceptible to those changes, which may lead to degraded video quality and degraded overall security efficiency. In order to prevent such efficiency degradation, site manger 112 may statically and/or dynamically allocate resources in environment 100 among a plurality of end-clients, such as, edge-devices 101, monitoring units 113, external storages 110 and end-users 111.

Site manager may communicate with network 114, e.g., with a network administrator, and a plurality of entities in environment 100, may query network 114 about its resources, e.g., entities in environment 100, and may implement based on the information gathered or dynamically received logic decisions, such as business logic decisions. Such a control of environment 100, also referred to herein as Video Admission Control (VAC) may improve a video quality in all networking architectures, such as for example, LAN, MAN and WAN systems and with all networking media, such as wire-line and wireless networks.

Site manager 112 may utilize VAC by implementing Policy Decision Function to (PDF) which may allocate resources of environment 100 across several end-users 111 according to priority, Service Level Agreement (SLA) or other parameters. Such a solution may be centralized, and may define the route between each source to its target, may optimize the network resources and may make sure that video may be delivered in a required quality.

In another embodiment of the invention an in-band signaling protocol may be implemented, such a protocol may reserve resources for a specific end-user 111 or a specific device. For example, implementing Resource Reservation Protocol (RSVP) in edge-device 101, so when edge-device 101 may wish to transfer a data stream, it may send a message to a network router to reserve a sufficient bandwidth for the transferred data stream. When a path for the data delivery may be allocated by network 114, an approval message may be sent back from network 114 to edge-device 101 and edge-device 101 may start to stream the data.

When there are not enough resources for transferring the data stream, for example when a certain router of network 114 is congested, with, for example, implementations of out-of-band management, site manager 112 may try to find an alternate path for transferring the data, e.g. an available router with a sufficient resources. Site manager 112 may propagate a request towards a target, for example, monitoring unit 113 or external storage 110 and in case a reserved path has been successfully allocated, site manger 112 may notify edge-device 101 to start streaming the data, e.g., video data. For example, a VAC message may be propagated by site manger 112 until a resource may be allocated for transferring the data.

In case site manger 112 may not find or allocate available resources for the data stream, for example, the required bandwidth according to the request of edge-device 101 may not be found; edge-device 101 may retry and send a resource reservation request again, within a predefined time window after a certain period of time from a first resource reservation request. Such process may be done for several times, until the required bandwidth may be allocated, for example, after end-user 111 finished play-back during the timeframe resources may be released. In case a time window has passed and the bandwidth may not be reserved, site manager 112 may allocate different bit rate for a first edge-device 101 or may change the bit rate of a second edge-device 101 in order to give the required bit rate for the first edge-device 101 The allocation of resources may be done by site manager 112 statically or dynamically according to priorities.

Embodiments of the invention may provide centralized management which may consist of dynamically gathering or receiving information from entities in environment 100 by site manger 112. For example, large sites or recording environments 100 may include a large number of sensor 104 each may have different requirements and statistics which may be dynamically, in real-time, delivered to site manager 112 and may be used to adjust in order to optimize the use of system resources. The optimization may be done by resources management and control of edge-devices 101 by site manager 112, e.g., allocate more resources to edge-devices which may need more on the expense of those edge-devices which may need less and by direct architecture of environment 100 to utilize storage to optimize the bandwidth utilization in real-time applications.

For example, site manger 112 may decide whether to save recorded data streams locally on internal storage 102 or on external storage 110. In addition, monitoring may be done directly from edge-devices 101 while playback may be done from any storage in environment 100, a direct architecture of environment 100 may provide a plurality of implementations to manage data as described in detail below with reference to FIG. 2 and FIG. 3.

Although in the exemplary illustration of FIG. 1, four external storages, four edge-devices, four end-users, four monitoring units and one site manager are shown, it should be understood to a person skilled in art that the invention is not limited in this respect and according to embodiments of the present invention, recording environment 100 may include any suitable numbers of external storages, edge-devices, end-users, monitoring units or site managers.

Figure 2:
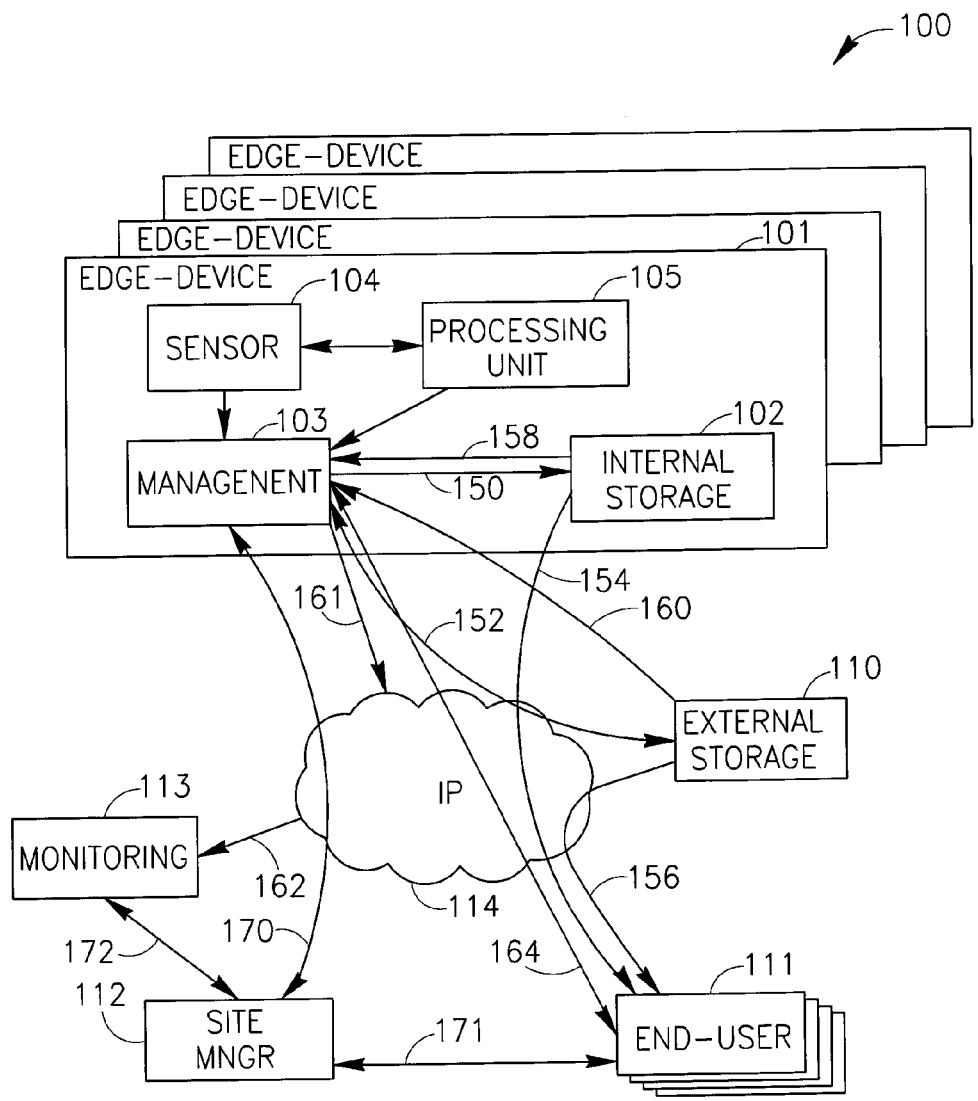
FIG. 2 is a block diagram of an exemplary recording environment according to embodiments of the present invention.

Reference is now made to FIG. 2, which is a block diagram of an exemplary recording environment according to embodiments of the present invention. Recording environment 100 may include one or more edge-devices 101 each may include one or more sensors 104, one ore more processing units 105 and a management module 103. Edge-device 101 may record and store data in an internal storage 102 and/or in an external storage 110. External storage 110 may be coupled to edge devices 101 via network 114.

Recording environment 100, also referred herein to as "system", may further include a site manager 112, a monitoring unit 113 and one or more end-users or players 111 all coupled to one or more edge-devices 101 via a wired or wireless communications network 114, for example, via an Internet Protocol (IP) network.

Sensors 104 may sense, collect and capture analog or digital input information, such as, video data, audio data, textual data and the like and may transfer the collected input information to processing module 105.

Processing module 105 may process the collected information, also refereed to herein as "raw data". The processing may include, for example, analog to digital conversion of the data, data compression, data analysis, addition of information related to the data, also known as "metadata". Any other flow, method or algorithm of data handling or processing may be performed by processing module 105.

Management module 103 may control sensors 104, internal storage 102 and processing module 105 and may control transferring and/or streaming the processed data e.g., analyzed data and/or compressed data, from processing module 105, for monitoring purposes or for storing and later playback purposes as described in detailed below with reference to embodiments of the present invention.

According to some embodiments of the invention, management module 103 may control the processed data transfer from processing module 105 internally, for storage in internal storage 102 as indicated by arrow 150 or over network 114, for storage in external storage 110 as indicated by arrow 152. The data may be transferred and saved in internal storage 102 and/or external storage 110 by using Ethernet protocols such as iSCSI, Intermediate Frequency (UF) protocols such as, USB, eSATA or any other communication infrastructure or protocol.

Site manager 112 may control, manage and synchronize entities in environment 100. Site manager 112 may have information regarding topology and structure of recording environment 100 or any other information regarding recording environment 100 to allow management of recordings, playback, monitoring and data analysis in recording environment 100. Site manager 112 may dynamically receive storage parameters from internal storage units 102 of edge devices 101 and from external storage units 110 and may instruct each edge device 101 where to store the video data based on the storage parameters received from internal storage units 102 and the externals storage units 110.

The received information or parameters may include, for example, channels to be recorded and storage information. The storage information may relate to all the storages of recording environment 100, e.g., internal storage 102 and/or external storage 110 and may include each storage structure and framework. The storage framework information may include, for example, information on where each channel is being recorded, which sensor used for the recording, storage layout including, for example, buffers location, buffers size, linked lists, index file or any other information.

According to embodiments of the invention, during initialization of recording environment 100 site manager 112 may initiate processing unit 105 via management module 103, as indicated by arrow 170 and may inform each of edge-devices 101, which channel to record, which parameters to use for the recording and where to store the recorded data. Site manager 112 may initiate end-users 111, as indicated by arrow 171 and may inform or transfer each end-user 111 the topology or structure of recording environment 100 and specifically the location of recorded data from each of the recorded channels.

Embodiments of the invention may allow direct and/or non-direct playback. In direct playback, end-user 111 may read the stored data directly from internal storage 102, as indicated by arrow 154, or directly from external storage 110, as indicated by arrow 156, based on information from site manager 112. In non-direct playback, the playback process may be performed via edge-devices 101, specifically via management module 103, e.g., the stored data may be transferred to management module 103 from internal storage 102, as indicated by arrow 158, or from external storage 110, as indicated by arrow 160 and from management module 103 to end-user 111 as indicated by arrow 164.

Although the scope of the invention is not limited in the respect, the data to be saved in internal storage 102 and/or external storage 110 may include media such as video data, audio data, alarms, events and the like. In addition to the recorded data, additional data or information may be saved in internal storage 102 and/or external storage 110. The data or information to be saved may include metadata related to the original recorded data or raw data.

Metadata may be extracted from raw video data and may include, for example, objects, motions, people counting, scenes, backgrounds information or any other information. Metadata may be extracted from raw audio data and may include, for example, word spotting, continuous voice recognition information, speaker identification and recognition or any other information. Metadata may be extracted from alarms and events and may include, for example, location information, internal and/or external, triggers used to start an event, such as opening a door, push button and the like.

According to embodiments of the present invention, the data or information to be saved in internal storage 102 and/or external storage 110 may include channel information and parameters such as, for example, channel number, recorded media type, recorded media parameters, recording time and date and/or any other information. Additionally or alternatively the data to be saved may include management information, such as, for example, buffers sizes, recorded channels and the like.

Although the scope of the invention is not limited in the respect, information or storage parameters related to the stored data may be stored or saved in a table format, also referred to herein as an "index table". The index table may be saved in internal storage 102 and/or external storage 110, preferably in the storage in which the recorded data itself is being saved. The index table may be managed and updated by processing module 105 or by site manager 112. A copy of the index table may also be saved in additional components of recording environment 100. For example, site manager 112 and/or end-users 111 may save a cached index table to increase the efficiency of recording environment 100 by avoiding accesses to processing module 105 for reading information. Processing module 105 may dynamically, in real-time, update the index table and the cached index tables upon having new information, for example, from site manager 112, as described in detail below.

During operation or normal work, site manager 112 may dynamically update, in real time end-users 111 and/or edge-devices 101 upon any change in recording environment 100, for example, any change in architecture of recording environment 100, number of edge-device 101, sensor 104 parameters and the like. In addition, each end-user 111 may request to receive information from site manager 112. The information may include, for example, on which storage recorded data of specific channels may be found, location of a specific storage and location of a specific recorded data in the storage. Such information may be retrieved by each end-user 111 from its cached index table to allow accelerated management time. When site manager 112 may be disconnected, end-user 111 and monitoring unit 113 may have the last site model and the cached index table and may request and receive additional information directly from management module 103 of edge-devices 101.

End-users 111 may wish to receive or retrieve recorded data and may request site manager 112 to identify required information, such as on the specific recorded channel required. Site manager 112 may inform end-users 111 which edge-device 101 has recorded the required data and on which storage the data has been stored, e.g., internal storage 102 and/or external storage 110.

According to some embodiments of the invention, end-users 111 may read the data directly from internal storage 102, directly from external storage 110 and/or through processing units 105 of edge-devices 101. End-users 111 may use iSCSI protocol or any other protocol to read the stored data.

The cached index table kept by end-users 111 may save time during play-back process and update of the cached index table may be performed by updating only information which was changed instead of reading the entire information of the index table from edge-device 101 at each update.

Monitoring unit 113 may control live monitoring of video, audio, alarms metadata or any other sensed data. Monitoring unit 113 may request and receive the location of a specific channel from site manager 112 as indicated by arrow 172. Site manager 112 may inform monitoring unit 113 which edge-device 101 is sensing and recording a specific channel. Monitoring unit 113 may request an edge device 101 to stream the data from a specific processing unit 105 and the processing unit 105 may send, transmit or stream the data through network 114 to monitoring unit 113 as indicated by arrows 171 and 172.

Although in the exemplary illustration of FIG. 2, each edge-device 101 is shown as having sensor 104, processing module 105, management module 103 and internal storage 102, it should be understood to a person skilled in art that the invention is not limited in this respect and according to embodiments of the present invention, any other configuration having similar functionality may be used. For example, sensor 104, processing module 105, management module 103 and internal storage 102 may each be implemented as a separate unit.

Although in the exemplary illustration of FIG. 2, one internal storage, one external storage, four edge-devices, four end-users, one monitoring unit and one site manager are shown, it should be understood to a person skilled in art that the invention is not limited in this respect and according to embodiments of the present invention, recording environment 100 may include any suitable numbers of internal storages, external storages, edge-devices, end-users, monitoring units or site managers.

Figure 3:
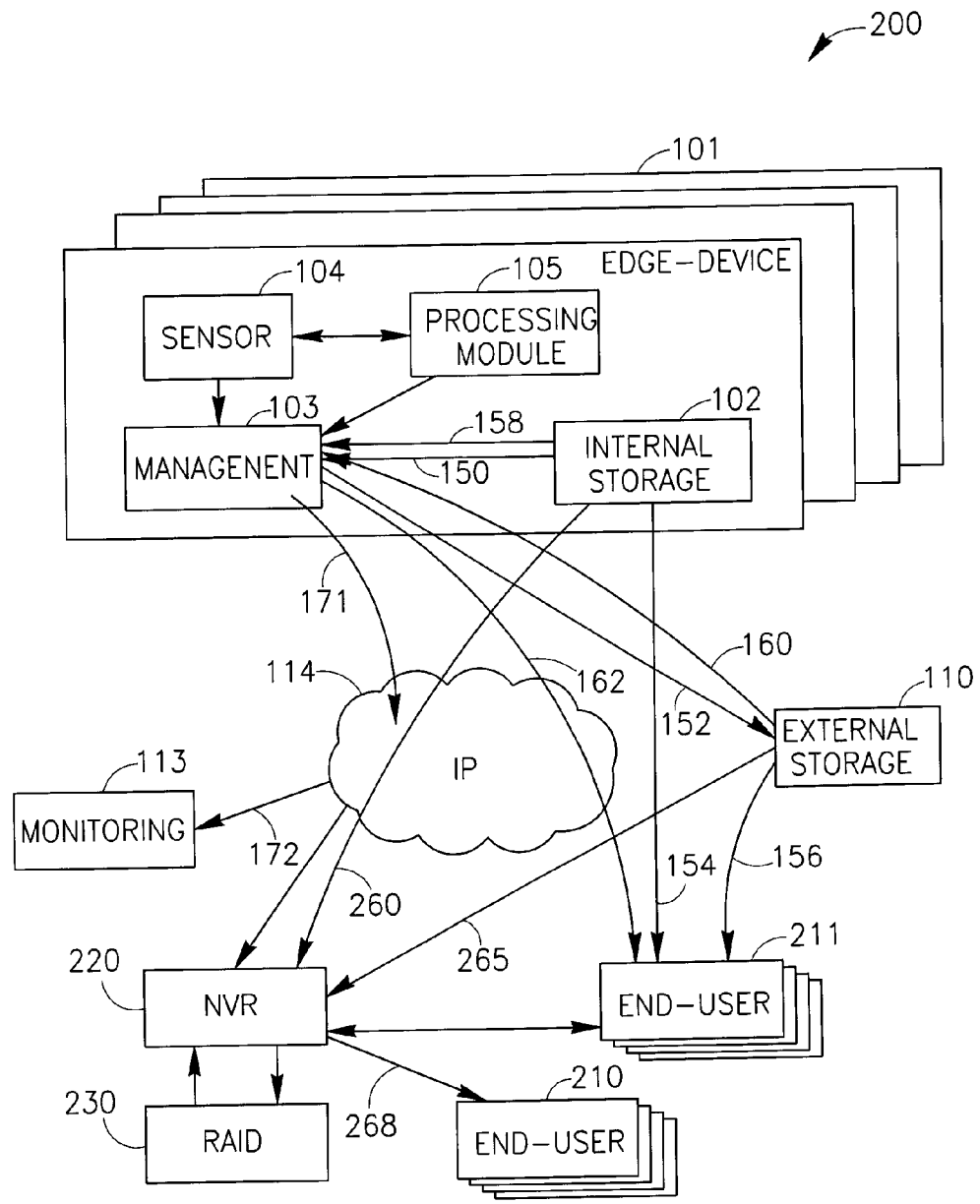
FIG. 3 is a block diagram of an exemplary recording environment having a network video recorder according to embodiments of the present invention.

Reference is now made to FIG. 3, which is high-level block diagram of an exemplary recording environment with a network video recorder (NVR) according to embodiments of the present invention. Recording environment 200 may include one or more edge-devices 101, each may include one or more sensors 104, one ore more processing units 105 and a management module 103. Edge-device 101 may record and store data in an internal storage 102 and/or in an external storage 110. External storage 110 may be coupled to edge devices 101 via network 114.

Recording environment 200 may further include NVR 220, a monitoring unit 113 and one or more end-user 211 all coupled to edge-devices 101 via a wired or wireless communications network 114, for example, via an Internet Protocol (IP) network.

According to embodiments of the present invention, NVR 220 may have the same functionality of site manager 112, as described with reference to FIG. 1, as well as additional features as described below. Recording environment 200 may provide the functionality and features provided by recording environment 100 of FIG. 1, as well as additional features provided by NVR 220.

Recording may be performed by edge-devices 101 and may be saved on local storage 102 and/or on external storage 110 as is detailed described with reference to FIG. 1. Although the scope of the invention is not limited in the respect, information related to the stored data may be stored in an "index table". The index table may be saved in internal storage 102 and/or external storage 110, preferably in the storage in which the data itself is being saved, and may be managed and updated by processing module 105. A cached index table may also be saved in additional components of recording environment 200. For example, NVR 220 and/or end-users 211 may save a cached index table to increase the efficiency of recording environment 200 by avoiding accesses to processing module 105 for reading information. Processing module 105 may dynamically, in real-time, update the index table and the cached index tables upon having new information, for example, from NVR 220.

Embodiments of the invention may allow playback via NVR 220 in addition to the direct and/or non-direct playback. In direct playback, end-user 211 may read the stored data directly from internal storage 102, as indicated by arrow 154, or directly from external storage 110, as indicated by arrow 156, based on the information from NVR 220. In non-direct playback, the playback process may be performed via edge-devices 101, specifically via management module 103. The stored data may be transferred to management module 103 from internal storage 102, as indicated by arrow 158, or from external storage 110, as indicated by arrow 160 and from management module 103 to end-user 211 as indicated by arrow 162.

Playback through NVR 220 may be used when a large number of end users 210 may need to read the stored data and when direct playback from internal storage 102 and/or storage 110 and indirect playback through management module 103 may not provide or support the playback required, due to technical limitations such as, a low bandwidth, a required bandwidth, a required processing power and the like. NVR 220 may read the stored data directly from internal storage 102, as indicated by arrow 260, or directly from external storage 110, as indicated by arrow 265. End users 210 may playback the recorded data via NVR 220, as indicated by arrow 268.

NVR 220 may be coupled to a local storage 230 which may be a Redundant Arrays of Inexpensive Drives (RAID) such that once the data was transferred to NVR 220 it may be saved in RAID 230 and NVR 220 may transfer the recorded data to end-users 210 from RAID 230. NVR 220 may allow a large number of end-users to playback stored data at the same time, as NVR 220 may amplify or enlarge the ability of transferring stored data to end-users 211.

Embodiments of the invention may allow end-users 211 to read the stored data directly from internal storage 102 or directly from external storage 110 without using NVR 220 while end-users 210 may read the stored data from NVR 220. For example, when NVR 220 is physically distant from an end-user 211, end-user 211 may read data directly from storage 110 as indicated by arrow 156 while end-users 210 may read data through NVR 220 as indicated by arrow 268.

In some embodiments of the invention, NVR 220 may use the live monitoring for recording purposes. In situations of a problem in network 114, NVR 220 may resume the data using playback from the internal storage 102 or external storage 110 which may be physically closer to monitoring unit 113 than end-user 210.

Figure 4:
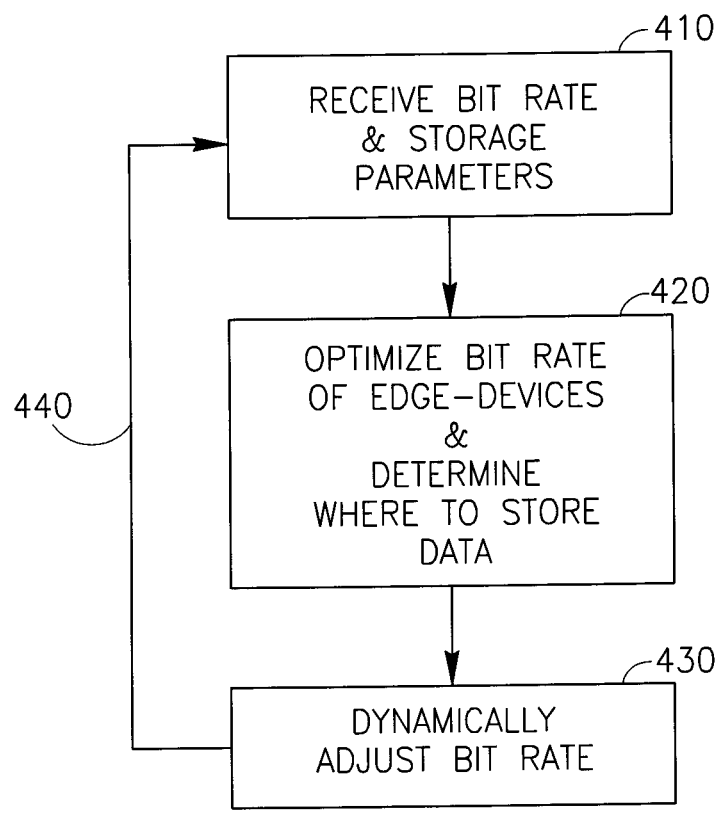
FIG. 4 is a flowchart of a method for direct playback in a recording environment having a plurality of storages according to embodiments of the present invention.

Reference is now made to FIG. 4, which is a flowchart of a method for managing distributed video data in recording systems according to embodiments of the present invention. Operations of the method may be implemented, for example, using recording environment 100 or recording environment 200, by one or more of the elements in recording environment 100 or recording environment 200 and/or by other suitable units, devices, and/or systems.

As indicated at box 410, the method may include dynamically receiving by a system manager, e.g., site manager 112, bit rate parameters related to video processing units of edge devices, e.g., edge-devices 101. The processing units, e.g., processing unit 105, may process video data received in real-time and may output the video data for storage and real-time monitoring. In addition, the method may include receiving a system manager storage parameters from internal storage units of the edge devices and from external storage units coupled to the edge devices via a network.

As indicated at box 420, the method may include optimizing the bit rate of each of the edge-devices 101. The optimization may be performed by site manager 112 and may include calculating, processing and executing of an optimization algorithm based on the received parameters. Further, the method may include determining by site manager 112 where to store data based on the storage parameters received from internal storages and external storages. For example, recorded data may be stored in an internal storage the edge-device. E.g., storage 102 or in storage external to the edge-device, e.g., external storage 110.

As indicated at box 430, the method may include dynamically adjusting the bit rate of processing units of each edge-device based on required bit rates of the processing units and bandwidth limitations of the network. The adjustment may be performed based on real-time reception of bit rate parameters as indicated by arrow 440.

The adjustment which leads to optimization may be done also on timely basis, for example if during a day time there may be more motion to be captured than during a night time the edge devices may need higher bit rate than at night time when the motion may be deceases.

The optimization may be done based on local bit rate requirements of each of edge-devices 101, parameters related to each edge-device 101, network limitations and storage parameters. The integration and optimization may be done using pre-defined data and real-time data received by site manager 112 according to varying requirements during different time periods and may include integration over time of requirements of edge-devices 101.

Figure 5:
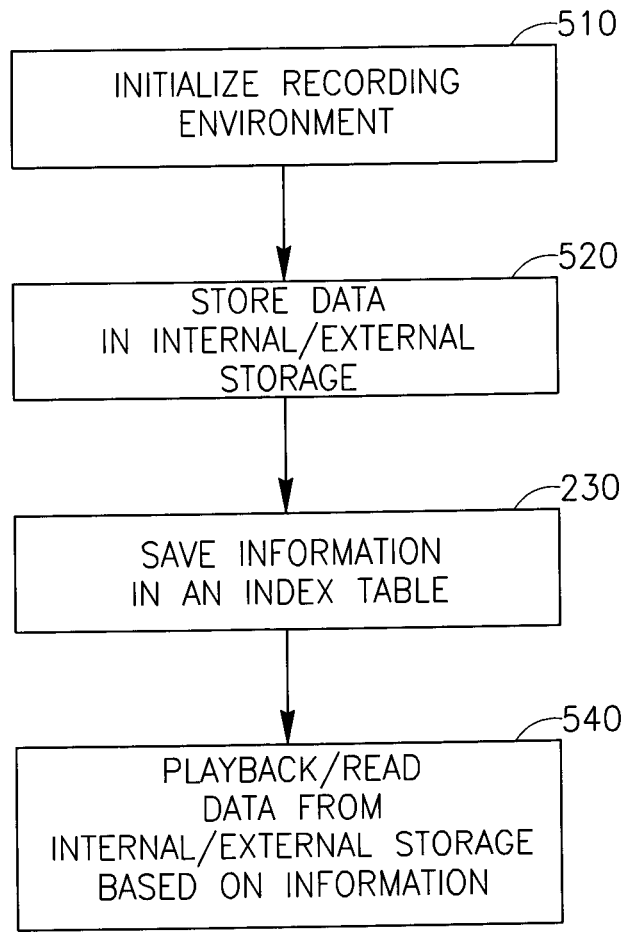
FIG. 5 is a flowchart of a method for direct playback in a recording environment having a plurality of storages according to embodiments of the present invention.

Reference is now made to FIG. 5, which is a flowchart of a method for direct playback in a recording environment having a plurality of storages according to embodiments of the present invention. Operations of the method may be implemented, for example, using recording environment 100 or recording environment 200, by one or more of the elements in recording environment 100 or recording environment 200 and/or by other suitable units, devices, and/or systems.

As indicated at box 510, the method may include initializing elements or devices of recording environment 100 by a site manager or a NVR, for example, site manager 112 of FIG. 1 or NVR 220 of FIG. 2. Initialization process may include determining and providing each edge-device of the recording environment, for example, edge-device 101 information regarding the recording process. The information may include, for example, which channel to record, which parameters to use, which storage to use for each recorded channel and the like.

Initialization process may also include providing end-users or players of the recording environment, for example, end-users 111, the topology or structure of recording environment 100 and specifically storage parameters such as the location of recorded data from each of the recorded channels. It should be understood to a person skilled in the art that initializing recording environment may include any other suitable steps, operations or sets of operations.

As indicated at box 520, the method may include storing recorded data, such as video data, audio data or any other recorded data in internal storage or/and in external storage. Internal storage may be a local storage of the recording device, for example, internal storage 102 while external storage may be a remote storage, e.g., located physically away from the recorded device, for example, external storage 110. The information whether to store a recorded data in an internal storage or in an external to storage may be received from a central management unit such as site manager 12 during the initializing process and may be adjusted dynamically in real-time. Any other suitable steps, operations or sets of operations.

As indicated at box 530, the method may include saving or storing information related to the recorded data, such as metadata, channel information and parameters such as, for example, channel number, recorded media type, recorded media parameters, recording time and date and/or any other information. Such data or information may be stored or saved in a table format, also referred to herein as an "index table". Such an index table may be saved in internal storage, for example, internal storage 102 and/or external storage for example, external storage 110, preferably in the storage in which the recorded data itself is being saved. A copy of the index table may also be saved in additional components of recording environment. For example, site manager 112 of FIG. 1, NVR 220 of FIG. 2 and/or end-users 111 may save a cached index table to increase the efficiency of the recording environment by avoiding accesses to edge devices, for example, edge devices 101, for reading information.

The method may further include dynamically, in real-time, updating the index table and the cached index tables upon having new information from, for example, site manager 112 or NVR 220 by repeating the method steps described by boxes 520 and 530.

As indicated at box 540, the method may include reading or play-backing the recorded data using direct and/or non-direct playback from internal storage or from external storage. In direct playback, an end-user, for example, end-user 111 may read the stored data directly from internal storage, e.g., internal storage 102 or directly from external storage, e.g., external storage 110 based on the information received from a management unit, for example, from site manager 112 of FIG. 1 or NVR 220 of FIG. 2. In non-direct playback, the recorded data may be transferred to an end-user via the edge device which recorded the data. For example, the stored data may be transferred from an internal storage or from an external storage to a management module in the edge device which recorded the data and from management module to an end-user.

Each end-user may request to receive information from a management module, for example, site manager 112 or NVR 220. The information may include, for example, on which storage recorded data of specific channels may be found, location of a specific storage and location of a specific recorded data in the storage. Such information may be retrieved by each end-user from its cached index table to allow accelerated management time.

Embodiments of the invention may allow playback via an NVR, for example, NVR 220 of FIG. 2 in addition to the direct and/or non-direct playback. Playback through NVR may be used when a large number of end users may need to read the stored data. The NVR may read the stored data directly from internal storage or directly from external storage.

The disclosed subject matter provides for a digital recorder that can utilize less storage than apparently needed by simple multiplication of needed retention by the total configured bitrate. The digital recorder of the disclosed subject matter may be a Network video encoder (NVR), a Digital video recorder (DVR), a Smart video recorder (SVR), a Hybrid video recorder (H-NVR) and the like. As the subject matter includes any kind of digital recorder desired by a person skilled in the art, the specification below discloses an NVR for simplicity.

A Global Rate Control (GRC) module, a computerized module included at the NVR or communicating with the NVR, allocates bitrates to multiple edge devices such as video cameras and encoders. As a result, all the multiple edge devices that use the same storage of the NVR achieve reduction of the storage needed to be used by the NVR. Separate bitrate allocation for each of the channels, or to different groups of channels, results in less storage to be used by the NVR and for more retention time for the same storage. Further, the GRC module enables regulating the bitrates of the various channels according to the actual retention time detected at the storage unit of the NVR.

The GRC module monitors bitrates of channels from which video is received at the NVR. The GRC module monitors the current retention time from the storage of the NVR. The GRC module further controls the bitrates of at least some of the channels, in order to lower the total bitrate of all channels and prevent the actual retention time to fall below a predetermined threshold.

The GRC module may also control the compression rate of an enhanced compression feature, which achieves more compressed video with no or minimal impact on the video quality. The GRC module may further lower the bitrate of the edge device. The adjustments may be gradual and limited in magnitude.

Figure 6:
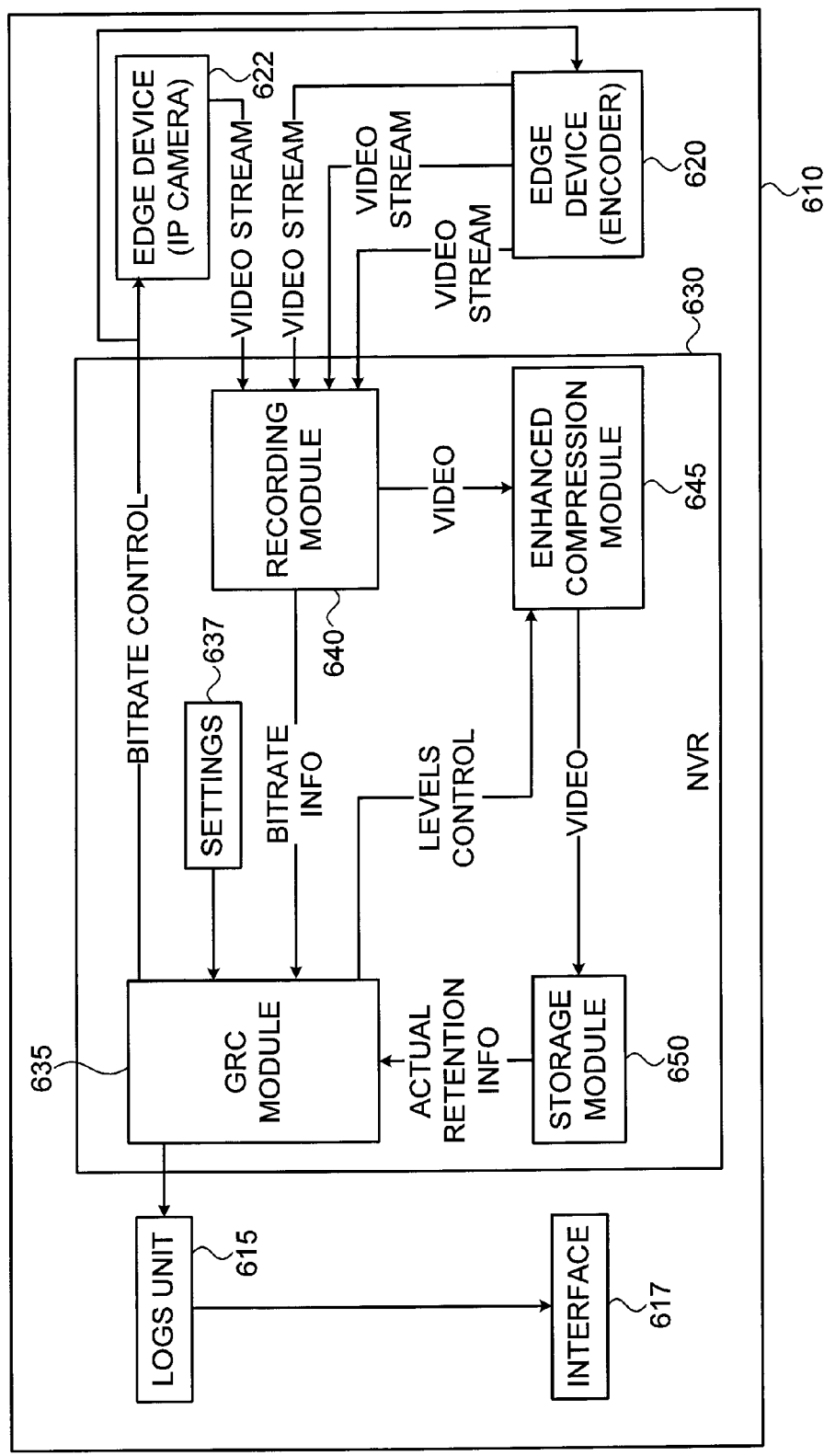
FIG. 6 shows the GRC module in relation to other components of the system, according to some exemplary embodiments of the subject matter.

FIG. 6 shows a GRC module in relation to other components of the system, according to some exemplary embodiments of the subject matter. The GRC module 635 operates in a computerized environment 610 in which video is recorded and transmitted to a storage unit. The video is recorded at a video camera 622. The term video camera 622 may refer to a plurality of video cameras, each of the plurality of video cameras may capture a different video. The video from the video camera 622 may be encoded using an encoder 620. The video camera 622 may be an IP camera or any other type of camera. The video camera 622 communicates with a network video recorder (NVR) module 630.

The NVR module 630 comprises a recording module 640 that receives the video stream from the edge devices, such as the video camera 622 and the encoder 620. The recording module 640 transmits bitrate data to the global rate control (GRC) module 635. The GRC module 635 controls the bitrates of the channels, in order to maintain at least a desired retention time of video recording in the constraints of currently available storage. The GRC module 635 further communicates with a storage module 650 that stores the video generated by the edge devices. The video is transferred to the storage module 650 from the recording module 640. In some cases, the video is transferred to the storage module 650 via a compression module 645.

The GRC module 635 controls the bitrates of the channels by obtaining and monitoring the current bitrates and current retention time as provided by the recording module 640 and the storage module 650, respectively. In some exemplary cases, the GRC module 635 may also regulate the level of enhanced compression algorithms, in cases of actually decreasing the bitrate of the NVR module 630, in order to maintain the desired retention time. The GRC module 635 transmits commands or messages to the edge devices for regulating the bitrate of the video camera 622. Similarly, the GRC module 635 may also transmit commands to the compression module 645 for regulating the compression rate of the video stored at the storage module 650.

The GRC module 635 may be connected to a settings unit 637. The settings unit 637 stores settings used by the GRC module 635 for regulating the bitrate of the channels used by the edge devices such as the video camera 622. For example, one setting stored at the settings unit 637 may be a minimal bitrate decrease for a specific channel. Another example of settings stores at the settings unit 637 may be priorities of channels used by the video camera. Such priorities may later be used when regulating the to bitrate of said channels, for example by determining the bitrate reduction thereof.

The GRC module 635 may be connected to a logs unit 615. The logs unit 615 stores data related to video generated by the video camera 622. Such data may be previously detected bitrates, compression rates and the like. Such data may be retention time detected at the storage module 650. Such data may be the amount of video captured by each of the video cameras, the compression rate of each channel, specific events at specific channels and the like. The logs unit 615 may be connected to an interface 617 for reviewing the data at the logs unit 615. The logs unit 615 enables valuable insights into the distribution of bitrate and behavior of video streams, retention and other parameters over time. The logs unit 615 enables general overview as well as drill down to separate channels and short periods of time.

In case all the channels in the NVR have the same storage, the GRC module 635 may allow different bitrates for different channels. The GRC module 635 provides bitrate flexibility, as the bitrate of some channels may increase and the bitrate of other channels may decrease. Similarly, when determining a total bitrate reduction of a predetermined amount, such as 15 percent, the bitrate of some of the channels may reduce in more than 15 percent, for example 22 percent, while the bitrate of other channels may reduce in less than 15 percent and still achieve the predetermined bitrate reduction. This way, the GRC module 635 can provide some channels with better video quality according to the importance of those channels.

Figure 7:
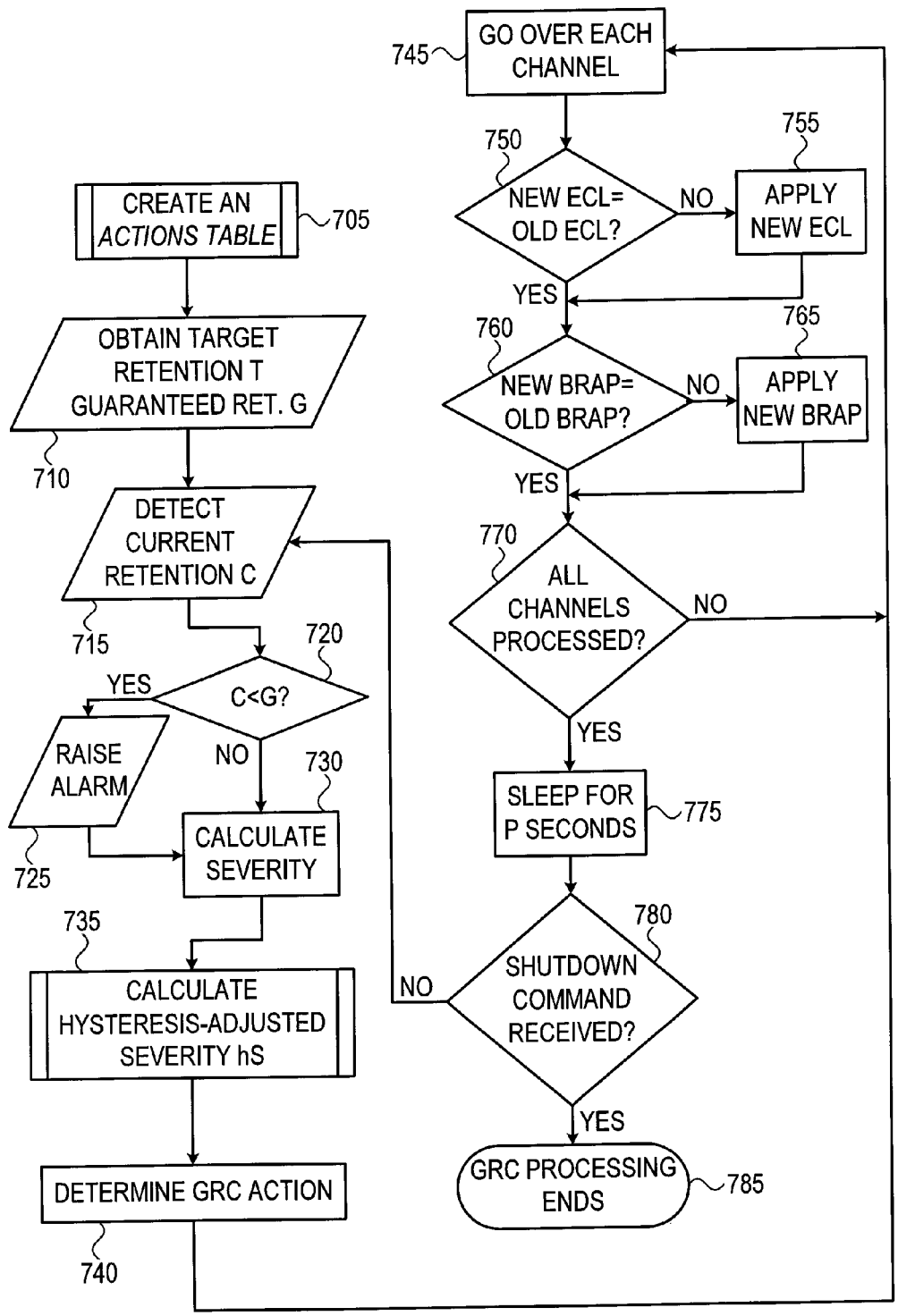
FIG. 7 illustrates a method for regulating performance of network video recorders, according to some exemplary embodiments of the subject matter.

FIG. 7 illustrates a method for regulating performance of network video recorders, according to some exemplary embodiments of the subject matter. In step 705, an actions table is created. Creation of the actions table is described in details in FIG. 8A. The actions table includes various operation modes and actions performed by the GRC module. The actions table may further include rules to be used by the GRC module in determining increase and decrease in parameters such as compression rate of the video and bitrate allocated to at least some of the channels via which video is provided from the edge devices to the NVR.

In step 710, the GRC module obtains a target retention T and a guaranteed retention G. The Target retention T is the retention that the GRC module aims to maintain. The Guaranteed retention G is the period of time in which the video is guaranteed to be stored at the NVR using the current NVR storage size. The target retention T is larger than the guaranteed retention G by a safety margin that can be configured and sometimes updated.

In step 715, the current retention C is detected. The Current retention C is the period of time for which the recorded video actually exists in the NVR. The Current retention C may be detected empirically by taking "the oldest existing video time" of each channel.

In step 720, the current retention C is compared with the guaranteed retention G. In case the current retention C is smaller than the guaranteed retention G, as shown in step 725, an alarm is raised, as a violation of the system requirements occurs. In case the current retention C is larger than the guaranteed retention G, as shown in step 730, a severity value is determined. The severity value is a number between 0 and 1, which denotes the "severity" of the current retention status. The severity value is defined as a function of the target retention T, the guaranteed retention G and the current retention C. In some cases, the severity value is defined as a difference between the current retention C and target retention T divided by a difference between the guaranteed retention G and the target retention T.

In step 735, a hysteresis severity value is determined. The determination of the hysteresis severity value is described in details in FIG. 9. Determination of the hysteresis severity value is used to prevent excessive frequent changes of parameters used to control the retention time of the NVR.

In step 740, the hysteresis severity value is used to determine parameters to be used to control the performance of the edge devices. Such parameters may be bitrate and compression rate. An action for controlling the performance of the edge device may be increasing or decreasing the bitrate of a specific channel or a specific edge device. The action to be performed by the GRC module in step 740 may be determined according to actions stored at the actions table. The GRC module may input a hysteresis severity value and other system parameters into the actions table to determine the action to be performed. Updating the bitrate of a specific edge device may be performed using a Bitrate Adjustment Percentage (BRAP). The BRAP is a value assigned to each channel or to a group of channels, controlled by the GRC module. The BRAP denotes the percentage of "requested device bitrate" relatively to "configured device bitrate". For example, the BRAP value "100%" means that no reduction is required. A BRAP value means that the device is reconfigured to the bitrate of 80% relatively to the original configured bitrate.

Updating the compression of a channel or a group of channels may be performed using an Enhanced Compression Level (ECL) value. The ECL value is assigned to each channel or to a group of channels and is controlled by the GRC module. The ECL value denotes the compression level performed by the Enhanced Compression module. In some cases, when the ECL value is zero, no additional compression is required and when the ECL value is 100, maximum level of enhanced compression is required.

Steps 750-765 are performed on all the channels communicating with the NVR. The term "all the channels" may also refer to a substantial amount of channels of all the channels communicating with the NVR. Each channel or group of channels may have an ECL value and a BRAP value stored or configured therein.

In step 750, it is detected whether the ECL value stored at a specific channel of all the channels is equal to the ECL value determined by the GRC module in step 740. The ECL value of one channel may be different from the ECL value of another channel. If the stored ECL value is different from the ECL value determined by the GRC module, as shown in step 755, the determined ECL value is applied instead of the stored ECL value.

In step 760, it is detected whether the BRAP value stored at a specific channel of all the channels is equal to the BRAP value determined by the GRC module in step 740. The BRAP value of one channel may be different from the BRAP value of another channel. If the stored BRAP value is different from the ECL value determined by the BRAP module, as shown in step 755, the determined BRAP value is applied instead of the stored BRAP value.

In step 770, it is determined whether or not all the channels have been checked as to the ECL value and BRAP value. If all the channels have been checked, as shown in step 775, the process is delayed for a predetermined period of time. Such time may be required to anticipate the influence of the updated ECL value and BRAP value on the current retention C.

In step 780, it is detected whether a shutdown command has been received at the GRC module. If a shutdown command has not been received, the process continues from detection of the current retention value C in step 715. If a shutdown command has been received, the GRC process ends, as shown in step 785.

The relation between an actual current retention state and an overall ECL and BRAP values distribution among all channels is defined in a manner that enables consistent actions at consequent measurements, without regard to the time elapsing between consequent measurements. Such actions may be updating the bitrate and compression rate. The relation between the values above should also allow immediate reaction to an abrupt measurement change. When the GRC module detects a situation very different from a previous measurement, the action, mainly distribution of ECL values and BRAP values, would be different, accordingly. The method disclosed above further automatically handles the issue of "startup"—when the NVR and GRC module starts (for example, after maintenance restart or failure), the GRC module will measure the current retention state relative to the guaranteed one, and will rapidly determine the appropriate working point.

Figure 8A:
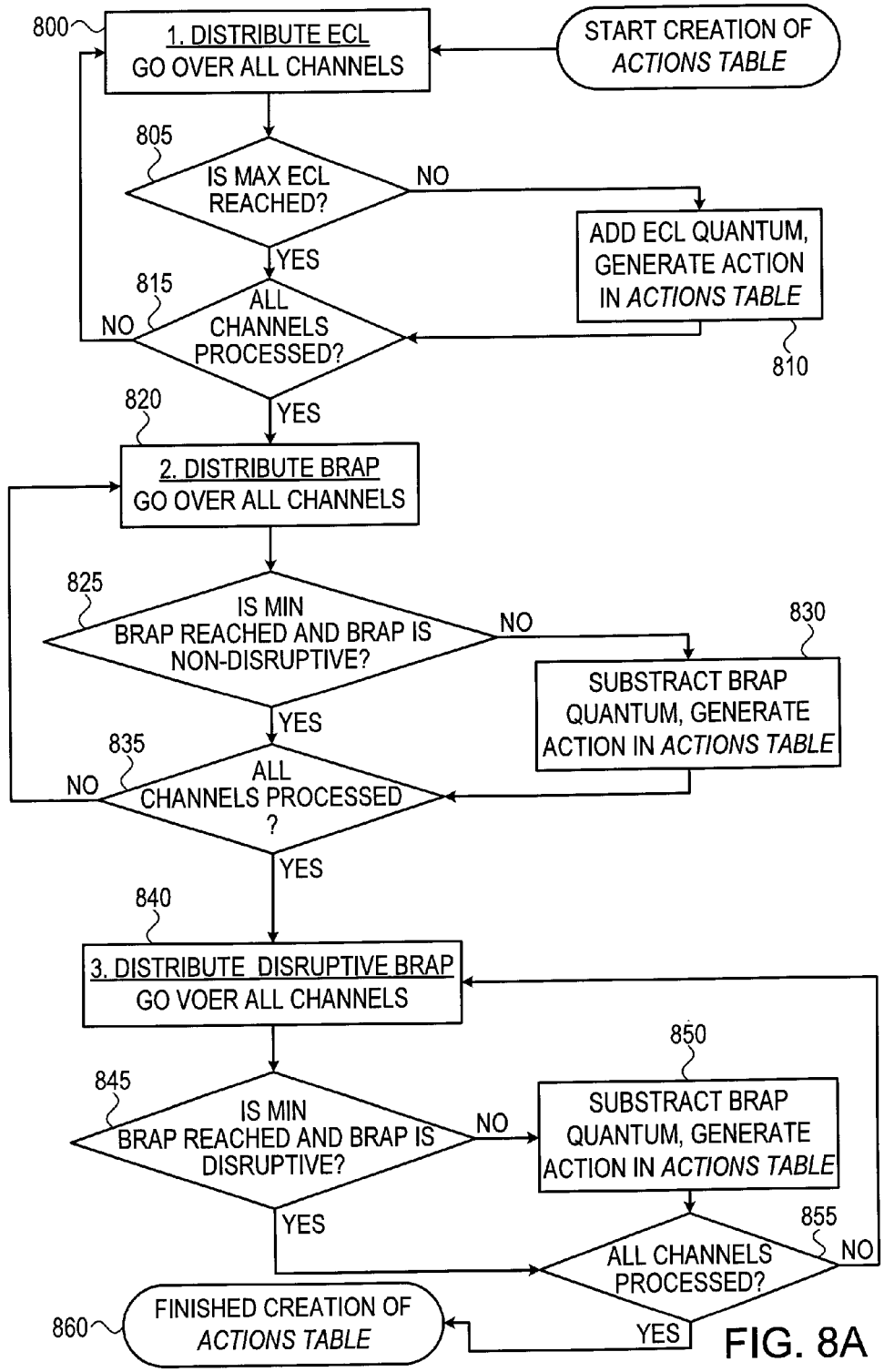
FIG. 8A illustrates a method for creating an actions table, according to some exemplary embodiments of the subject matter.

FIG. 8A illustrates a method for creating an actions table, according to some exemplary embodiments of the subject matter. The actions table defines a relation between a "severity" value and a distribution of ECL and BRAP values for all the recording channels. The actions table is created at startup or when the recording channels are added or removed. In step 800, all channels communicating with the GRC module are reviewed. Review of the channels may be performed according to a priority or a bitrate of the channel. In step 805, it is detected whether the maximum ECL value has been reached. The maximum ECL value may be 100, and denotes a maximum available compression level of Enhanced Compression Algorithm. If the maximum ECL value has been reached, as shown in step 815, the next channel is checked until all channels are checked as to the ECL value. If the maximum ECL value has not been reached, as shown in step 810, an ECL quantum value is added to the ECL value of the channel.

In such case, a new row is generated at the action table. The new row comprises a severity value and associated ECL values and BRAP values of at least a portion of the channels associated with the GRC module. The quantum value is a value that represents a sensitivity of updating ECL values and BRAP values. For example, if the ECL quantum value is 5, then the only possible values of ECL that the GRC will apply to a channel are 0, 5, 10, . . . , 95, 100. If a BRAP quantum value is 10, and the minimum BRAP is 80%, the only possible BRAP values that the GRC module will apply to a channel are 100, 90 and 80.

After all the channels have been processed as to the ECL values of the actions table, the GRC module reviews all the channels as to the BRAP value, as disclosed in step 820. In step 825, it is detected whether the minimum BRAP value has been reached. The minimum BRAP value (for example 80) means that the GRC will NOT degrade the requested bitrate of the edge device to less than 80% of an originally configured bitrate. This is a guarantee that the bitrate (and hence quality) degradation is limited in magnitude. If the minimum BRAP value has been reached, as shown in step 835, the next channel is checked until all channels are checked as to the BRAP value. If the minimum BRAP value has not been reached, as shown in step 830, a BRAP quantum value is subtracted from the BRAP value of the channel. In such case, a new row is generated at the action table. The new row comprises a severity value and associated ECL values and BRAP values of at least a portion of the channels associated with the GRC module.

Changing bitrate on certain types of edge devices requires stream re-start, which produces a short (0.5-1 seconds) interruption in the stream—an undesirable effect. Channels associated with edge devices that may suffer stream re-start or other possible deficiencies may be marked with a Disruptive BRAP flag. Channels marked with the Disruptive BRAP are handled after the non-marked channels, in order to have a chance to avoid updating the bitrate of the Disruptive BRAP flagged channels.

After the non-flagged channels have been processed as to the ECL values and BRAP values of the actions table, the GRC module reviews all the Disruptive BRAP flagged channels as to the disruptive BRAP value, as disclosed in step 840. In step 845, for each channel it is detected whether the minimum BRAP value has been reached. If the minimum BRAP value has been reached, as shown in step 855, the next channel is checked until all channels are checked as to the BRAP value. If the maximum BRAP value has not been reached, as shown in step 850, a BRAP quantum value is subtracted from the BRAP value of the channel. In such case, a new row is generated at the action table. The new row comprises a severity value and associated ECL values and BRAP values of at least a portion of the channels associated with the GRC module.

FIG. 8B shows an actions table, according to exemplary embodiments of the disclosed subject matter. The actions table of the exemplary embodiment comprises 12 rows, each row represents an action. In some cases, the actions to be performed by the GRC module are selected according to a severity value. An action can relate to some of the channels or to all of the channels. For example, action number 1 relates to channel 1 only, while action number 7 relates to updating the ECL values of all three channels and updating the BRAP value of channel 2 only. In some exemplary cases, the actions table comprises a plurality of rows, each row includes at least some of the channels communicating with the GRC module. In such exemplary case, the actions table comprises a plurality of rows that assemble a permutation of the different possible ECL values and BRAP values of each of the channels.

In some cases, the actions performed by the GRC module are arranged in a sorted list. Such sorted list may be used to satisfy system preferences, for example updating ECL values before checking whether there is a need to update BRAP values. Another motivation to sort the actions table is to achieve a desired ordering of operations on channels. In the example disclosed below, the action is appliance of one additional quantum of bitrate-reducing factor. For example, if the ECL quantum value is 50, the enhanced compression value per channel may be 0, 50 or 100.

One example of managing the actions table discloses a GRF module communicating with three channels, whereas channels 1 and 2 have regular BRAP value and channel 3 has disruptive BRAP value. The average bitrate of channel 2 is greater than the bitrate of channel 1 and the bitrate of channel 3 is the least. All the channels have the same priority for bitrate reduction, the quantum ECL value 50, the ECL range is 0-100, the quantum BRAP value 10 and the BRAP range is 80-100. In such case as disclosed above, the list of possible actions would be arranged in the following order:

1. Initially, all ECL levels are zero, and all BRAP levels are 100.
2. Channel 2 has ECL raised to 50.
3. Channel 1 has ECL raised to 50
4. Channel 3 has ECL raised to 50
5. Channel 2 has ECL raised to 100
6. Channel 1 has ECL raised to 100
7. Channel 3 has ECL raised to 100
8. Channel 2 has BRAP lowered to 90
9. Channel 1 has BRAP lowered to 90
10. Channel 2 has BRAP lowered to 80
11. Channel 1 has BRAP lowered to 80
12. Channel 3 has BRAP lowered to 90
13. Channel 3 has BRAP lowered to 80

Figure 9:
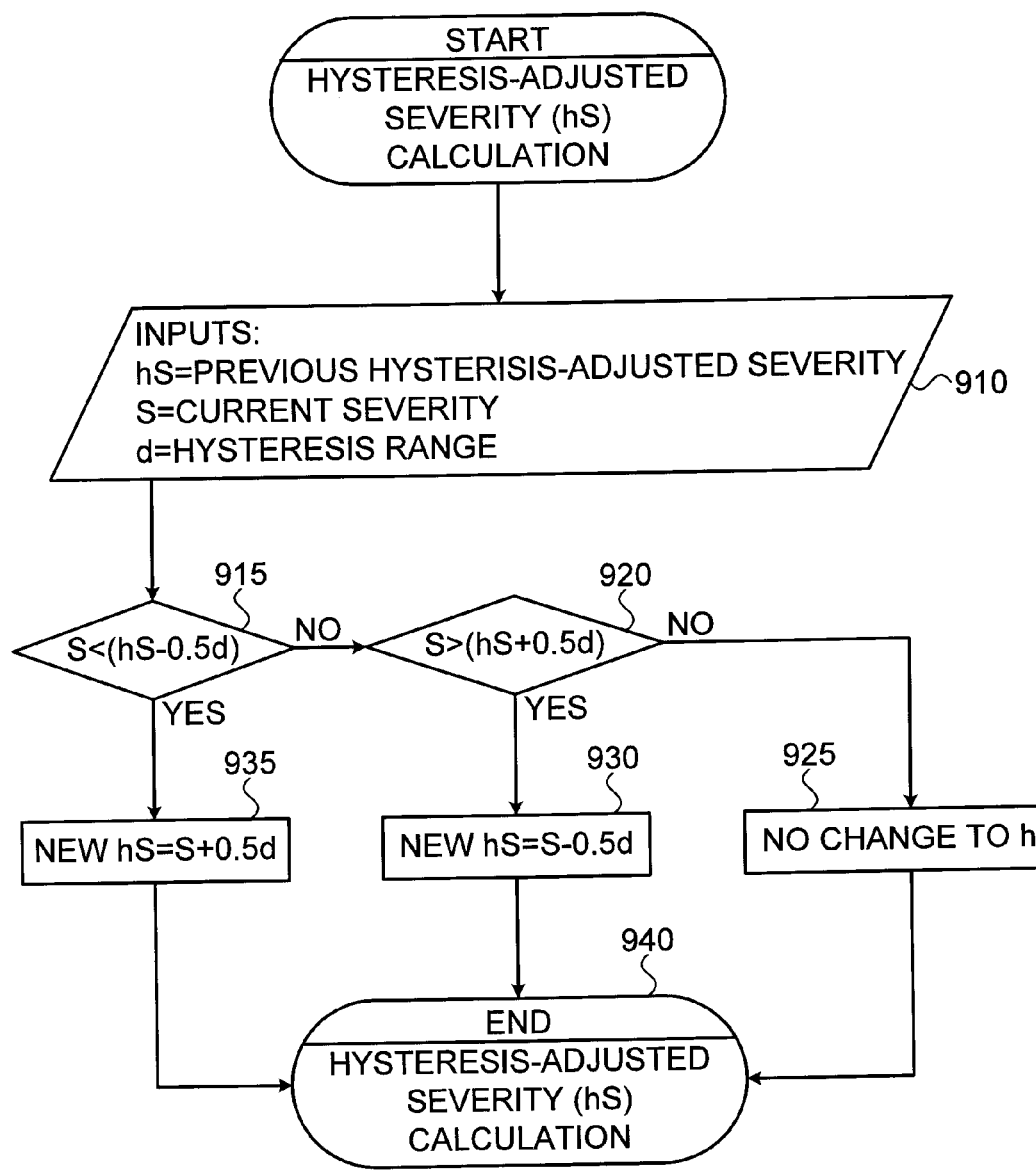
FIG. 9 illustrates a method for calculating a hysteresis-adjusted severity, according to some exemplary embodiments of the subject matter.

FIG. 9 illustrates a method for calculating a hysteresis-adjusted severity, according to some exemplary embodiments of the subject matter. The method receives, in step 910, an input of severity value S, and a hysteresis range D and previous hysteresis-adjusted severity Hs. The severity value S is disclosed in details in step 730 of FIG. 7. In some cases, the hysteresis range D may be a number between 0 and 1. In step 915, it is checked whether the severity value S is smaller than Hs−0.5d. If the severity value S is smaller than Hs−0.5d, as shown in step 935, the new hysteresis-adjusted severity value Hs equals S+0.5d. If the severity value S is not smaller than Hs−0.5d, as shown in step 920, it is checked whether the severity value S is bigger than Hs−0.5d. If the severity value S is bigger than Hs−0.5d, as shown in step 930, the new hysteresis-adjusted severity value Hs equals S−0.5d. If the severity value S is bigger than Hs−0.5d, as shown in step 925, the hysteresis-adjusted severity value does not change. In step 940, the new hysteresis-adjusted severity value is calculated according to the steps above.

Figure 10:
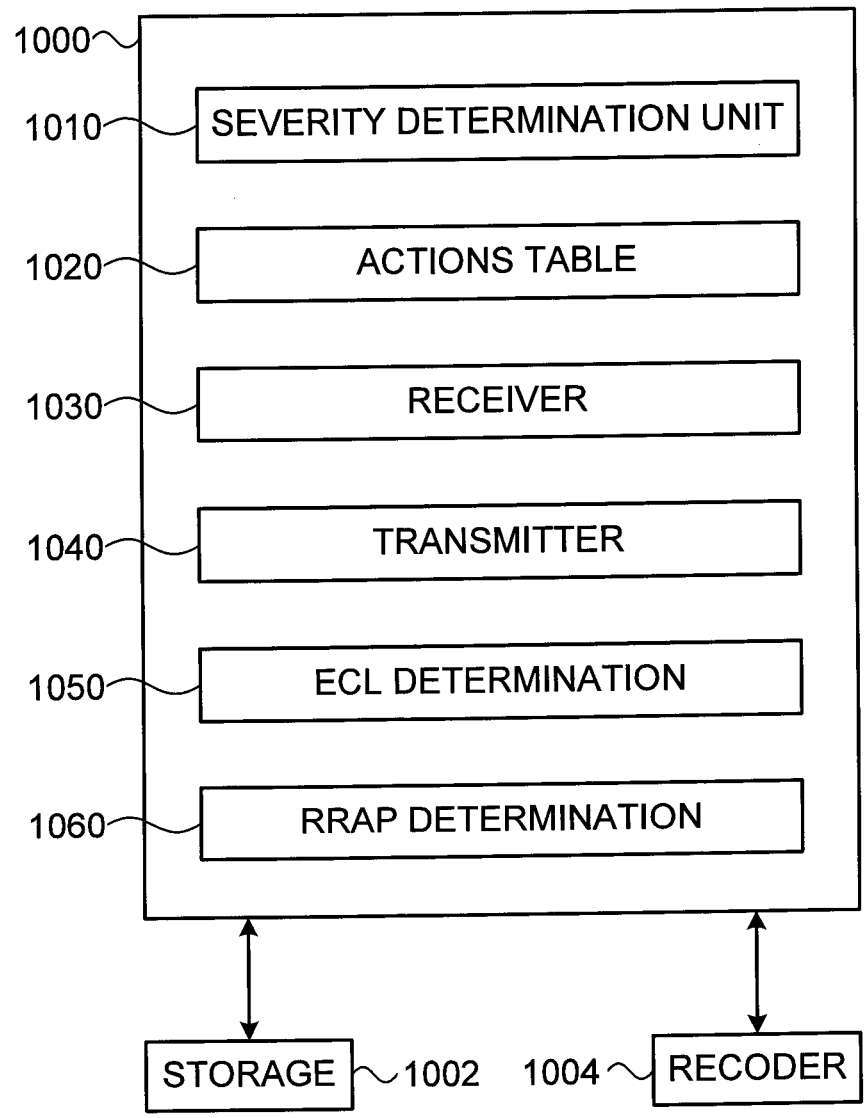
FIG. 10 illustrates a GRC module, according to some exemplary embodiments of the subject matter.

FIG. 10 illustrates a GRC module, according to some exemplary embodiments of the subject matter. The GRC module 1000 communicates with a storage module 1002 and with a recorder 1004. The GRC module 1000 comprises a receiver 1030 for receiving information used for controlling the performance of video provided from edge devices in an NVR. The receiver 1030 may be used for receiving current retention value from the storage module 1002. The receiver 1030 may also be configured to receive bitrates of channels communicating with the NVR. The data received at the receiver 630 may be sent to other modules of the GRC module 1000.

The GRC module 1000 may also comprise an actions table 1020. The actions table 1020 comprises a set of rules according to which the GRC module 1000 operates in controlling the performance of video provided from edge devices in the NVR. The actions table 1020 comprises multiple situations and actions to be made according to the data received at the receiver 1030. For example, when receiving bitrates of a specific value or in a specific range, and having a current retention time of a specific value, the GRC module 1000 may use the data at the actions table to determine the change in video parameters of the edge devices, such parameters may be compression rate and bitrate.

The GRC module 1000 may also comprise a BRAP determination unit 1060 for determining a BRAP value of one or more channels or a group of channels. In some cases, the BRAP determination unit 1060 determines the change between current bitrate and the next bitrate to be allocated to a specific channel or edge device. In other cases, the BRAP determination unit 1060 determines the bitrate to be allocated to a specific channel or edge device. In some cases, the BRAP determination unit 1060 determines the BRAP value according to the actions table 1020.

The GRC module 1000 may also comprise an ECL determination unit 1050 for determining an ECL value of one or more channels or a group of channels. In some cases, the ECL determination unit 1060 determines the change between current compression rate and the next compression rate to be allocated to a specific channel or edge device. In other cases, the ECL determination unit 1050 determines the compression rate to be allocated to a specific channel or edge device. In some cases, the ECL determination unit 1050 determines the ECL value according to the actions table 1020.

The GRC module 1000 may also comprise a severity determination unit 1010 for determining severity. The severity determination unit 610 may perform step 730 disclosed in FIG. 7.

The GRC module 1000 may also comprise a transmitter 1040 for transmitting control messages to edge devices communicating with the GRC module 1000. The control messages may include updates BRAP values, ECL values, compression rates, bitrates and the like. The In some exemplary cases, two or more NVRs sharing the same network storage may communicate with a single GRC module 1000. This way, bitrate "overload" in one NVR could be compensated by lesser bitrate in another NVR. In such case, the GRC module 1000 may first transmit the control messages to each NVR, and each NVR will transmit the control messages to the relevant edge devices.

The subject matter may also be used to utilize the existing surplus storage to improve the video-quality while maintaining the required retention time. When the difference between the total actual recording bitrate and the configured bitrate is bigger than a predetermined threshold, the total retention time for the same storage will be much higher than configured. If the user has no need for such large retention time, or if the user is required not to store the video past a predefined retention period, the system will have an unutilized storage capacity. In the context of the GRC module, such scenario is equivalent to having a current retention time bigger than the target retention time and, accordingly, a negative severity value. The GRC module can then increase the bitrates of all or some of the channels, in order to increase the video-quality, and thus the extra-storage will be used, while still maintaining the current retention time greater or equal to the target retention. The GRC module may perform such bitrate increase by configuring the "maximum BRAP" to be more than 100. The actions table will be expanded to contain the entries for the negative "severity" values, with the values of BRAP greater than 100.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for managing edge devices deployed in a site, comprising:
    configuring the edge devices stream bit rate by a computerized component linked to the edge devices via a network;
    receiving compressed streams from at least a portion of the edge devices;
    measuring an actual bit rate of the compressed streams;
    comparing the actual bit rate and a bit rate configured by the computerized component linked to the edge devices;
    receiving parameters related to bit rate processing; and
    according to the received parameters, adjusting by the computerized component via the network the bit rate of one of the edge-devices based on required bit rates of the edge devices, retention of the edge devices, bandwidth limitations of the network associated with edge devices, storage, viewing clients and performance limitations of computerized entities in the network.

2. The method according to claim 1, wherein adjusting by the computerized component further comprises adjusting the edge devices dynamically according to constraints to locally record video thereon and to further transfer the data to an external storage device.

3. The method according to claim 1, wherein adjusting by the computerized component further comprises setting a priority of at least one of the edge devices.

4. The method according to claim 1, wherein adjusting by the computerized component further comprises setting, based on a schedule, the edge devices for optimized performance thereof in terms of bit rate and storage allocation.

5. The method according to claim 1, wherein adjusting by the computerized component further comprises increasing the video quality of at least one of the edge devices.

6. The method according to claim 1, wherein adjusting by the computerized component further comprises directing the video data of at least one of the edge devices to a reserved data device in case of a malfunctioning communication with a previously allocated data device.

7. The method according to claim 1, wherein adjusting by the computerized component further comprises increasing bit rate of at least one of the edge devices on the expense of another edge device having its bit rate decreased by the computerized component.

8. The method according to claim 1, wherein adjusting by the computerized component further comprises adjusting the edge devices dynamically according to time-related parameters measured statistically and historically.

* * * * *